United States Patent [19]

Strouss

[11] 4,331,326

[45] May 25, 1982

[54] STUD MOUNTED TOGGLE CLAMP WITH A SECONDARY RELEASE MECHANISM

[76] Inventor: Richard W. Strouss, R.D. #3, Hanover, Pa. 17331

[21] Appl. No.: 172,534

[22] Filed: Jul. 28, 1980

[51] Int. Cl.$^3$ .............................................. B23Q 3/02

[52] U.S. Cl. ...................................... 269/93; 269/157; 269/228

[58] Field of Search .................... 269/228, 93, 91, 157

[56] References Cited

U.S. PATENT DOCUMENTS

| | | | |
|---|---|---|---|
| 2,544,329 | 3/1951 | Kirk | 269/228 X |
| 3,124,347 | 3/1964 | Maddad | 269/91 |
| 4,083,548 | 4/1978 | Hackbarth | 269/228 |
| 4,084,803 | 4/1978 | Beekenkamp | 269/91 |

*Primary Examiner*—Robert C. Watson

[57] ABSTRACT

A clamp for releasably securing a workpiece to a support surface comprising a fixed member, a single stud mounting the fixed member to the support surface, a movable clamping member slidably coupled to the fixed member, and a handle-actuated toggle mechanism for reciprocating the clamping member into and out of the clamping position and for locking it in such position. A secondary release mechanism, in addition to the handle, is slidably mounted to the fixed member and has a cam thereon which cams the toggle mechanism out of its locking position.

9 Claims, 7 Drawing Figures

STUD MOUNTED TOGGLE CLAMP WITH A SECONDARY RELEASE MECHANISM

FIELD OF THE INVENTION

The present invention relates to a toggle clamp for releasably securing a workpiece to a support surface. A single stud mounts the clamp to the support surface. The clamp includes a secondary mechanism, in addition to a handle, for releasing the workpiece from the clamp.

BACKGROUND OF THE INVENTION

A common practice for holding various workpieces together to form composite structures comprises securing the individual pieces to a support surface by a plurality of nuts and bolts. This process, including tightening, adjusting and loosening the bolts and nuts, is very time consuming and therefore very expensive.

While there are numerous hold-down type clamps known for holding workpieces, they are usually very complicated and expensive to manufacture. In addition, the mechanisms for securing such clamping devices to a work surface are complex and bulky. Moreover, many of these prior art clamping devices do not provide a quick-acting release mechanism.

Such prior art clamping devices are disclosed in the following U.S. Pat. Nos.: 2,456,100 issued to Wood on Dec. 14, 1948; 2,544,329 issued to Kirk on Mar. 6, 1951; 2,567,436 issued to Lampe on Sept. 11, 1951; 2,574,281 issued to Olson on Nov. 6, 1951; 2,972,476 issued to Blatt on Feb. 21, 1961; 3,170,214 issued to Cochrane on Feb. 23, 1965; 3,237,463 issued to McPherson on Mar. 1, 1966; 3,451,668 issued to Robinson on June 24, 1969; and 4,083,548 issued to Hackbarth on Apr. 11, 1978.

SUMMARY OF THE INVENTION

Accordingly, a primary object of the present invention is to provide a clamp for a workpiece that is uncomplicated and inexpensive to manufacture.

Another object of the present invention is to provide such a clamp that has a single stud mounting it to a work surface which is therefore simple and does not require a large amount of space.

Another object of the present invention is to provide such a clamp that includes a toggle mechanism with a quick release therefor.

Another object of the present invention is to provide such a clamp with a toggle mechanism that is biased in the unclamping direction.

The foregoing objects are basically attained by providing a clamp for releasably securing a workpiece to a support surface, the combination comprising a fixed member; a stud rigidly coupled to the fixed member and rigidly coupled to the support surface; a movable clamping member having a surface for clamping the workpiece to the support surface; means for slidably coupling the movable clamping member to the fixed member; and means for reciprocating the movable clamping member towards the support surface into a workpiece clamping position and away from the support surface into a workpiece releasing position and for locking the movable clamping member in the workpiece clamping position, the means for reciprocating and locking including a handle, means for pivotally coupling the handle to the fixed member, a pair of toggle links, means for pivotally coupling the toggle links to the handle, and means for pivotally coupling the toggle links to the movable clamping member and for slidably coupling the toggle links to the fixed member.

Since the mounting assembly for the clamp comprises a single stud, the overall clamp is simply connectible to the work surface and does not take up a large amount of space.

Another aspect of the present invention includes providing the clamp with a secondary release mechanism slidably coupled to the fixed member for unlocking the movable clamping member from the workpiece clamping position.

This is accomplished by means of a main body portion being slidably coupled to the fixed member with a cam engagable with the handle of the toggle mechanism. Merely pushing the main body portion downwardly, such as by striking it with a hammer, causes the cam to engage the handle, push the toggle mechanism over the center and thus unlock the toggle mechanism. Advantageously, a biasing mechanism can be incorporated to bias the movable clamping member away from the workpiece so it moves towards the unclamping position when the cam acts on the handle.

Other objects, advantages, and salient features of the present invention will become apparent from the following detailed description which, taken in conjunction with the annexed drawings, discloses a preferred embodiment of the present invention.

DRAWINGS

DETAILED DESCRIPTION OF THE INVENTION

Figure 2:
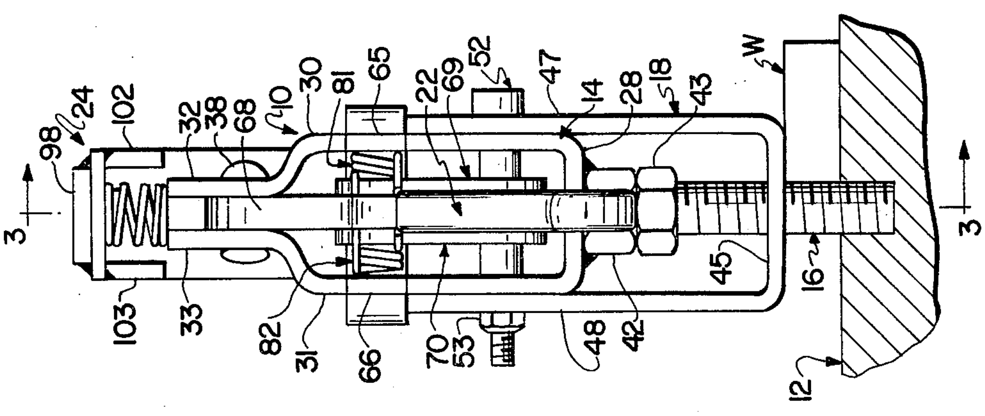
FIG. 2 is a side elevational view of the clamp in accordance with the present invention in the workpiece clamping position.

As seen in FIG. 2, the clamp 10 in accordance with the present invention releasably secures a workpiece W to a support surface 12.

Figure 1:
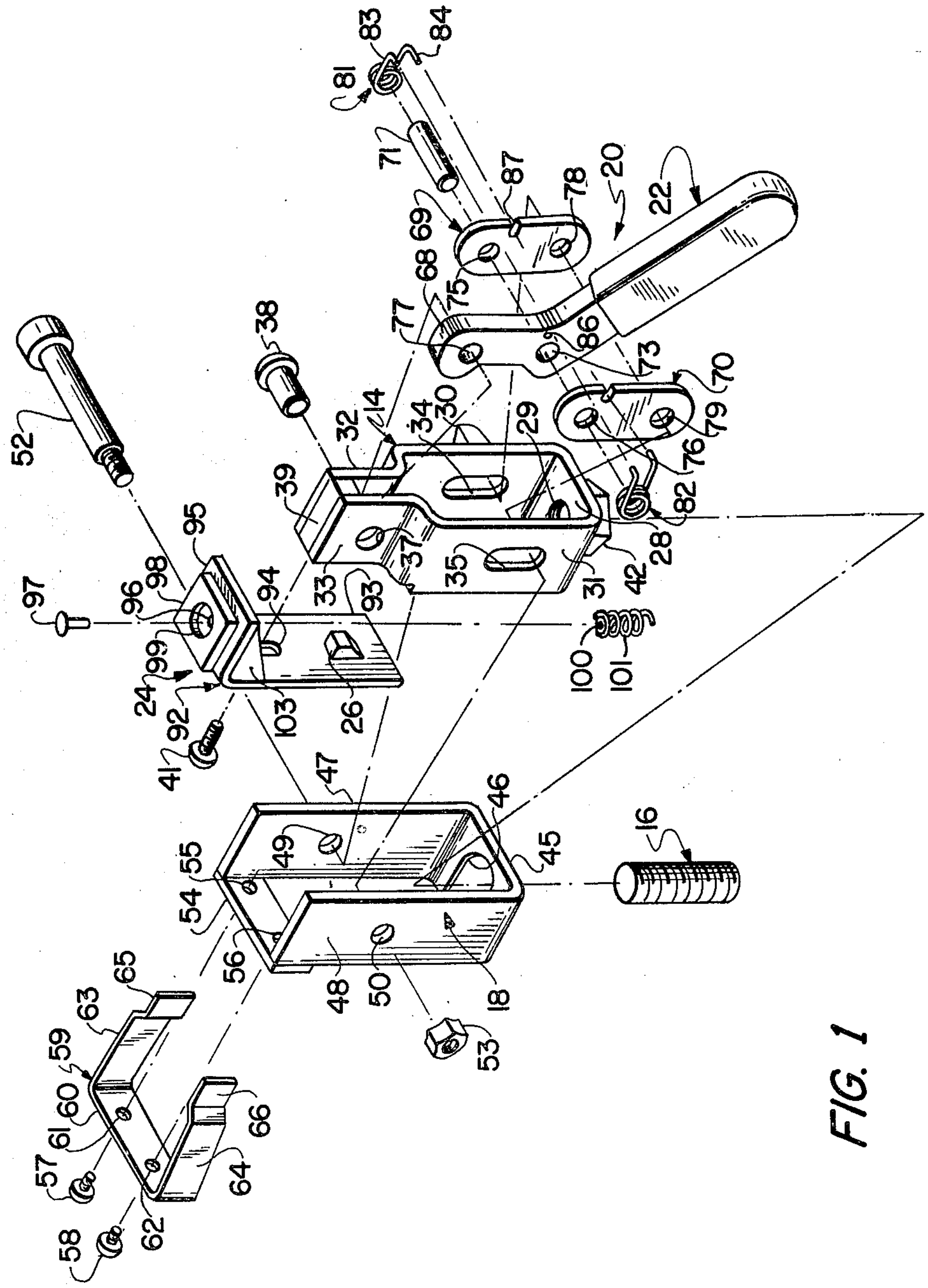
FIG. 1 is an exploded perspective view of the clamp in accordance with the present invention.
Figure 3:
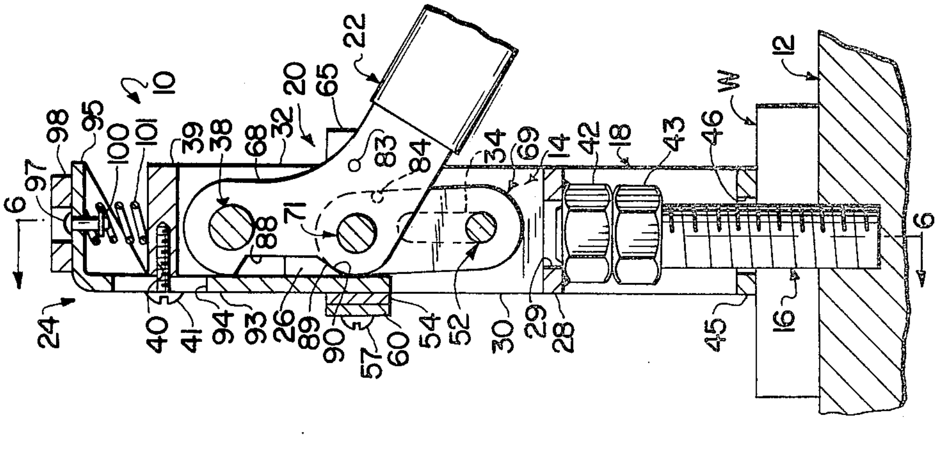
FIG. 3 is a vertical sectional view taken along lines 3—3 in FIG. 2 showing the clamp in the workpiece clamping position.
Figure 6:
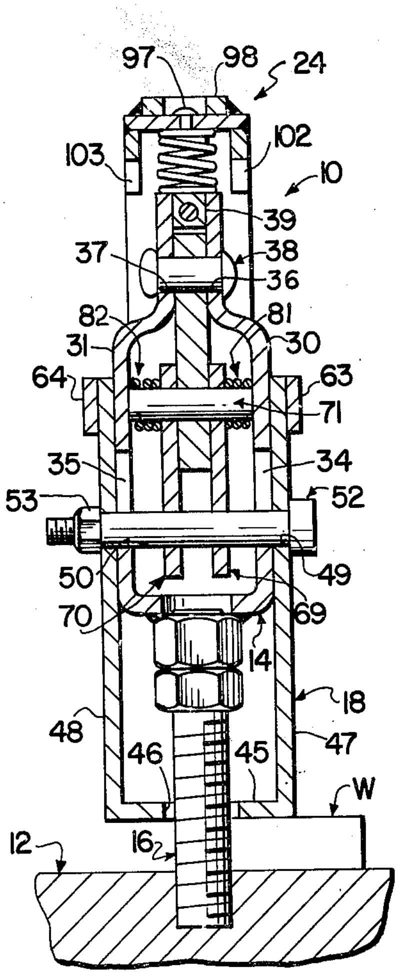
FIG. 6 is a sectional view of the clamp in the clamping position taken along lines 6—6 in FIG. 3.

As seen in FIGS. 1-3, the clamp 10 comprises a fixed member 14, a stud 16 rigidly coupled to the fixed member and to the support surface 12, a movable clamping member 18 for clamping the workpiece W to the support surface 12, and a toggle mechanism 20 for reciprocating the clamping member towards the support surface into a workpiece clamping position and away from the support surface into a workpiece releasing or open position and for locking the clamping member in the clamping position.

As seen in FIG. 3, the clamping member 18 is in the clamping position releasably securing the workpiece W against the support surface 12. This is accomplished by pivoting the handle 22 of the toggle mechanism 20 in the clockwise direction. In this position, the toggle mechanism 20 is over the center and thus locks the clamping member 18 against the workpiece W. To release the clamping member, the handle 22 is pivoted in the counterclockwise direction to a position shown in FIG. 5. This causes the clamping member 18 to move away from the workpiece and support surface.

Figure 4:
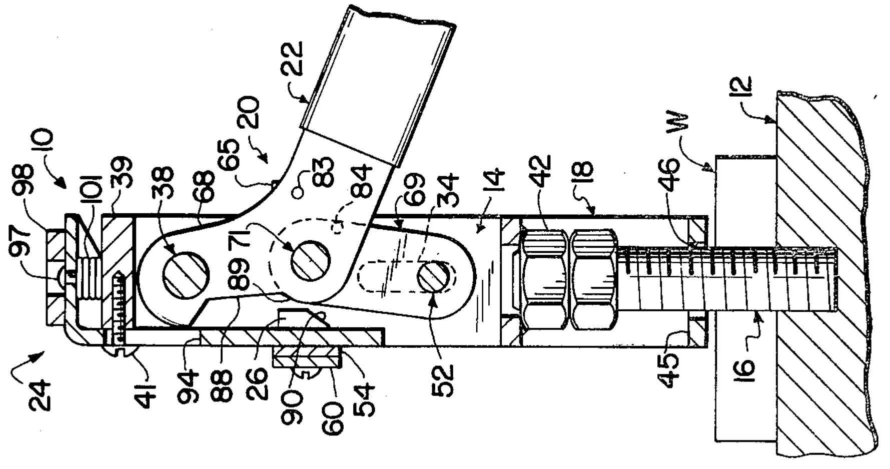
FIG. 4 is a sectional view similar to that shown in FIG. 3 except that the secondary release mechanism has been pushed downwardly so that the cam has contacted the handle unlocking the toggle mechanism and allowing the movable clamping member to move upwardly out of the clamping position.

Another way of unlocking the toggle mechanism is by use of a secondary release mechanism 24 as seen in FIG. 4 in which a cam 26 engages a part of the handle 22 and pushes the toggle mechanism over the center to allow a releasing thereof.

Referring now to FIGS. 1–3, the fixed member 14 comprises a rectangular base 28 having a central bore 29 therein, two upstanding legs 30 and 31 extending perpendicularly from the sides of the base 28, and two mirror-image L-shaped extensions 32 and 33 extending upwardly respectively from legs 30 and 31, all integrally formed from a single piece of material. Legs 30 and 31 are parallel, each having longitudinally elongated slots 34 and 35 respectively therein. Similarly, extensions 32 and 33 are parallel, each having aligned bores 36 and 37 for the reception of a rivet 38. Received between the two extensions 32 and 33 is a spacer 39 in the form of an elongated block having a longitudinally extending threaded, blind bore 40 therein. This bore 40 threadedly receives screw 41 which slidably couples the secondary release mechanism 24 to the fixed member 14.

Welded coaxially to bore 29 on the bottom of base 28 of the fixed member 14 is a nut 42. This nut threadedly receives stud 16 which is an elongated cylindrical rod having external threads and which extends perpendicularly from the support surface. This stud 16 is suitably secured to the support surface 12 by means, for example, of a threaded bore extending into the support surface 12. By rotating the fixed member 14 and nut 42 fixed thereto relative to the threaded stud 16, the elevation of the fixed member 14 relative to support surface 12 can be varied. This allows the clamp 10 to accommodate workpieces of varying thicknesses. A second nut 43 is threadedly received on stud 16 below nut 42 to lock the fixed member in the desired position.

Figure 7:
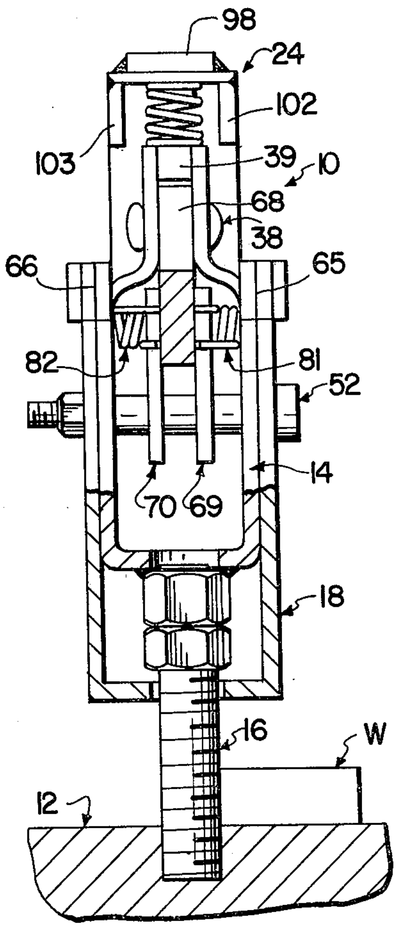
FIG. 7 is a sectional view of the clamp in the released position taken along lines 7—7 in FIG. 5.

As seen in FIGS. 1–3, the movable clamping member 18 is basically U-shaped and comprises a rectangular base 45 with an opening or aperture 46 centrally located therein for receiving stud 16, which opening has an interior diameter larger than the exterior diameter of the stud 16 to allow relative movement therebetween. Extending upwardly and integrally from base 45 are two parallel, rectangular legs 47 and 48, each having a bore 49 and 50, respectively, therein. A bolt 52 is received in the aligned bores 49 and 50 and is secured therein by means of nut 53. Near the top of the clamping member 18 a plate 54 is rigidly connected, such as by welding, to the sides of legs 47 and 48, this plate having two horizontally spaced threaded bores 55 and 56 for the reception of two screws 57 and 58 which secure a guide assembly 59 to the clamping member 18. This guide assembly comprises a base 60 having horizontally spaced bores 61 and 62 for screws 57 and 58 and two legs 63 and 64 extending from the base. These legs 63 and 64 have L-shaped extensions 65 and 66 which are received around legs 30 and 31 of the fixed member 14 as seen in FIGS. 2, 3 and 7.

Referring now to FIGS. 1, 2, 3 and 6, the toggle mechanism 20 is shown comprising handle 22 having an extension 68 forming a central link, two toggle links 69 and 70, and a shaft 71 which pivotally couples the two toggle links to the handle 22.

Handle 22 has a bore 73 for the reception of shaft 71 and toggle links 69 and 70 have upper bores 75 and 76 for the same purpose. Near the distal end of the extension 68 on handle 22 is an additional bore 77 which receives rivet 38 therein, thereby pivotally coupling the handle 22 to the fixed member 14. The two toggle links 69 and 70 in addition have lower bores 78 and 79 which pivotally receive bolt 52, which also passes through slots 34 and 35 in the fixed member 14 and bores 49 and 50 in the clamping member 18. Thus, the two toggle links 69 and 70 are pivotally coupled to the movable clamping member 18 via bolt 52 and are slidably coupled via bolt 52 to the fixed member 14. Extension 68 is at an angle of about 60° to the longitudinal axis of the handle 22.

Figure 5:
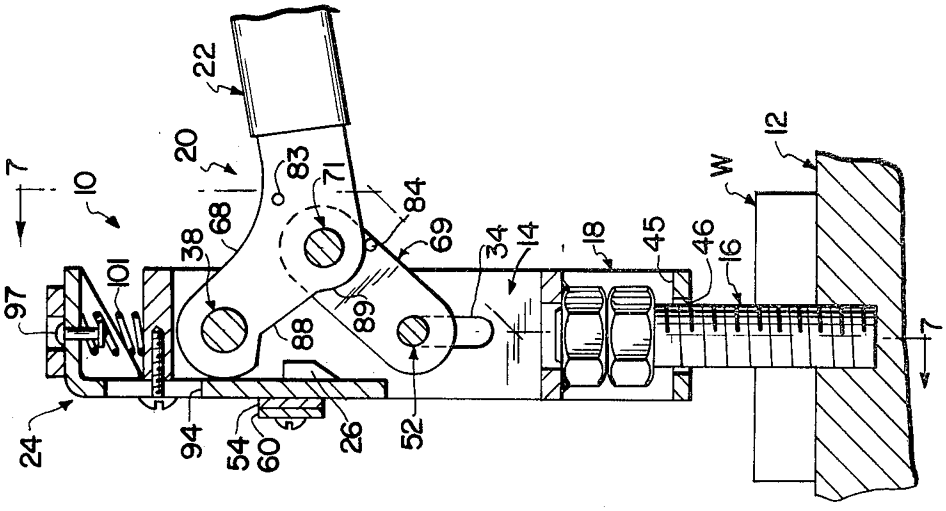
FIG. 5 is a sectional view similar to that shown in FIG. 4 except that the clamp is in its released or open position.

Two torsion springs 81 and 82 are received on the distal ends of shaft 71, each having two legs 83 and 84 received respectively in a bore 86 in handle 22 adjacent bore 73 and in a notch 87 in each toggle link 69 and 70. As seen in FIGS. 5 and 7, these torsion springs 81 and 82 tend to bias the toggle links towards extension 68 of the handle 22 so as to move the movable clamping member 18 away from the support surface 12.

As seen in FIGS. 1 and 3–5, extension 68 on handle 22 has a recess 88 with a flat cam follower surface 89 facing the secondary release mechanism 24 for engagement with a cam surface 90 in the form of a wedge at the bottom of cam 26 on the secondary release mechanism 24.

As seen in FIG. 1, this secondary release mechanism 24 comprises a main body portion 92 which is L-shaped including a vertical leg 93 carrying the cam 26 thereon and having a longitudinally extending slot 94 and a horizontal leg 95 with a central bore 96 for receiving a pop-rivet 97. A plate 98 is welded to the top of horizontal leg 95 and has a central bore 99 surrounding the top of the pop-rivet 97. At the distal end of the rivet 97 is secured a disc 100 which is rigidly coupled to a spring 100, the bottom of the spring, as seen in FIG. 3, resting on spacer 39 at the very top of the fixed member 14. As seen in FIGS. 1–3, two triangular reinforcing plates 102 and 103 are welded to the bottom of horizontal leg 95 in the release mechanism 24 and abut the vertical leg 93.

Operation

In order to secure a workpiece W to the support surface 12, handle 22 of the toggle mechanism 20 is pivoted clockwise as seen in FIG. 5. This will cause the handle 22 to pivot via rivet 38 relative to the fixed member 14. Such pivoting action causes the toggle links 69 and 70 to pivot relative to the handle 22 via shaft 71 in a counterclockwise direction. This causes the two toggle links 69 and 70 to pivot relative to the fixed member 14 via bolt 52 and also pivot relative to the movable clamping member 18 via bolt 52. In addition, such pivotal movement of the handle 22 causes bolt 52 to move downwardly through slots 34 and 35 in the fixed member 14, thereby carrying the movable clamping member 18 therewith. Thus, the clamping member 18 moves downwardly axially of the fixed member 14 and axially along stud 16 towards the support surface 12, with the bottom surface of base 45 of the clamping member 18 clamping the workpiece W against the support surface 12, as seen in FIG. 3.

In order to lock the clamping member 18 in this position, the central axis of the shaft 71, as seen in FIG. 3, is a little off center or to the left of a vertical line between the centers of the rivet 38 and bolt 52.

In order to unlock or open the clamping member 18, the handle 22 is moved counterclockwise as seen in FIG. 3, reversing the operation discussed above. This counterclockwise rotation is aided by the torsion springs 81 and 82 which tend to bias the toggle links 69 and 70 clockwise about shaft 71 and towards extension 68 on handle 22.

Another method of opening or unclamping the clamping member 18 is accomplished by utilizing the secondary release mechanism 24. This can be used to save time since all that is necessary is a striking blow downwardly on the release mechanism 24.

In particular, as seen in FIG. 3, cam 26 on the secondary release mechanism 24 is adjacent and in contact with cam follower surface 89 on handle 22. A downward blow on plate 98 at the top of the release mechanism causes a downward movement thereof guided by screw 41 in slot 94 in the release mechanism and the vertical leg 93 of the release mechanism between legs 30 and 31 of the fixed member and by plate 54 coupled to the movable member 18.

This downward movement of the release mechanism 24 causes the cam 26 to move downwardly so that the cam surface 90 pushes the cam follower surface 89 on handle 22 to the right as seen in FIG. 4 over the line connecting the centers of rivet 38 and bolt 52 so that the toggle mechanism 20 is no longer in the over-the-center locking position. Once the toggle mechanism 20 is released from this locking position, the two torsion springs 81 and 82 tend to move the clamping member 81 upwardly towards the position shown in FIGS. 5 and 7.

Thus, the present invention provides a simply constructed clamping device with a quick-acting release mechanism. In addition, the present invention can be used as a direct replacement for nuts or threaded screws on pre-existing work-securing devices. No alterations are required to these devices whereas other types of clamps would require welding or drilling and tapping of additional bores.

While one advantageous embodiment has been chosen to illustrate the invention, it will be understood by those skilled in the art that various changes and modifications can be made therein without departing from the scope of the invention as defined in the appended claims.

What is claimed is:

1. A clamp for releasably securing a workpiece to a support surface, the combination comprising:
  a fixed member;
  a stud rigidly coupled to said fixed member and rigidly coupled to the support surface;
  a movable clamping member having a surface for clamping the workpiece to the support surface;
  said movable clamping member having an opening in said clamping surface receiving said stud therein;
  means for slidably coupling said movable clamping member to said fixed member; and
  means for reciprocating said movable clamping member towards the support surface into a workpiece clamping position and away from the support surface into a workpiece releasing position and for locking said movable clamping member in the workpiece clamping position,
  said means for reciprocating and locking including
    a handle,
    means for pivotally coupling said handle to said fixed member,
    a pair of toggle links,
    means for pivotally coupling said toggle links to said handle, and
    means for pivotally coupling said toggle links to said movable clamping member and for slidably coupling said toggle links to said fixed member.

2. A clamp according to claim 1, wherein
  said movable clamping member includes a base portion and two legs extending therefrom,
  said two legs receiving said fixed member therebetween.

3. A clamp according to claim 2, wherein
  said base portion has an opening therein receiving said stud.

4. A clamp according to claim 1, wherein
  said stud is threaded, and
  said fixed member has an internally threaded member threadedly receiving said threaded stud to adjust the location of said fixed member relative to said support surface.

5. A clamp according to claim 1, wherein
  said means for reciprocating and locking further includes means for biasing said movable clamping member away from the support surface.

6. A clamp for releasably securing a workpiece to a support surface, the combination comprising:
  a fixed member;
  means for rigidly coupling said fixed member to said support surface;
  a movable clamping member having a surface for clamping the workpiece to the support surface;
  means for slidably coupling said movable clamping member to said fixed member;
  means for reciprocating said movable clamping member towards the support surface into a workpiece clamping position and away from the support surface into a workpiece releasing position and for locking said movable clamping member in the workpiece clamping position,
  said means for reciprocating and locking including
    a handle,
    means for pivotally coupling said handle to said fixed member,
    a pair of toggle links,
    means for pivotally coupling said toggle links to said handle, and
    means for pivotally coupling said toggle links to said movable clamping member and for slidably coupling said toggle links to said fixed member, and
  secondary release means, slidably coupled to said fixed member, for unlocking said movable clamping member from the workpiece clamping position;
  said means for rigidly coupling said fixed member to said support surface comprising a single rod rigidly coupled to said fixed member and rigidly coupled to the support surface,
  said movable clamping member having an opening receiving said rod.

7. A clamp according to claim 6, wherein
  said secondary release means includes
    a main body portion, means for slidably coupling said main body portion to said fixed member, and a cam rigidly coupled to said main body portion in a position to engage said means for reciprocating and locking upon movement thereof towards the support surface.

8. A clamp according to claim 7, wherein said handle has a surface for engagement with said cam.

9. A clamp according to claim 7, wherein said secondary release means includes a spring interposed between said main body portion and said fixed member for maintaining said cam in a predetermined rest position.

* * * * *